Aug. 22, 1933.  H. J. HOUPERT  1,923,266
PLANT SPRAYING APPARATUS
Filed April 4, 1931   2 Sheets-Sheet 1
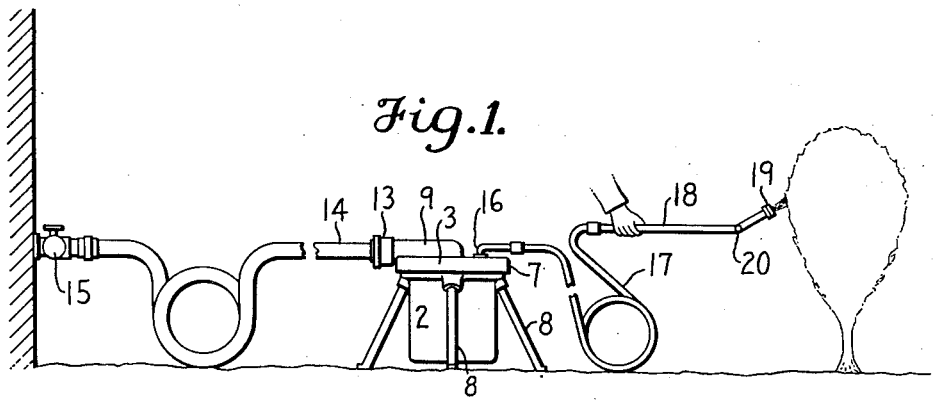
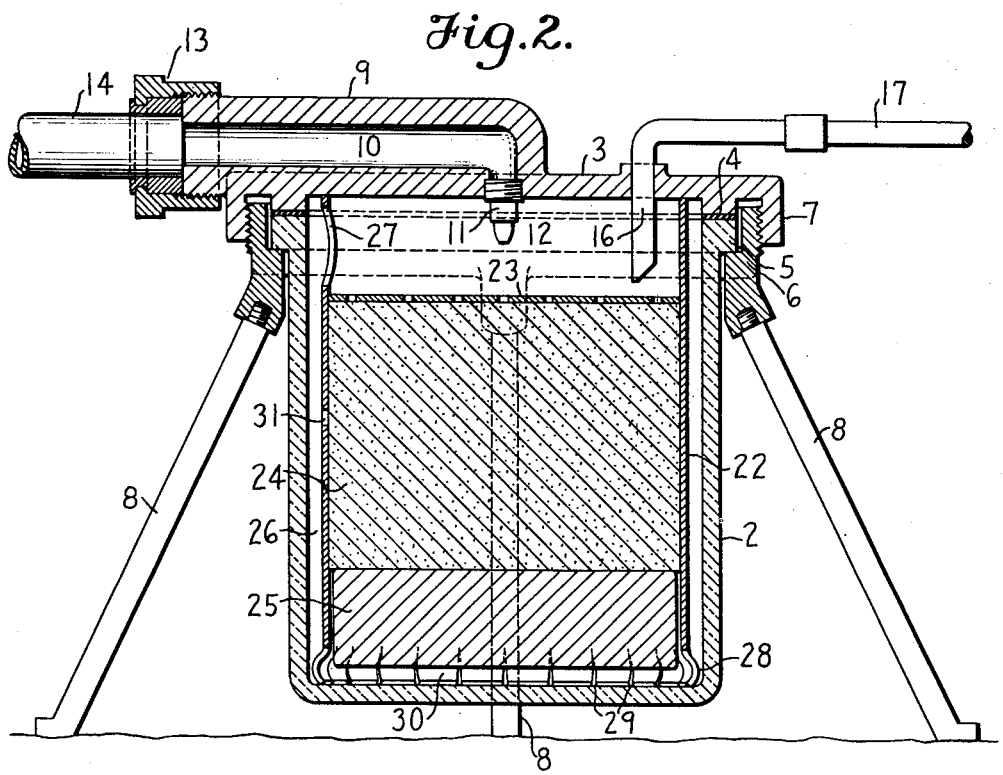
INVENTOR
Henri J. Houpert
BY
ATTORNEY Aug. 22, 1933.   H. J. HOUPERT   1,923,266
PLANT SPRAYING APPARATUS
Filed April 4, 1931   2 Sheets-Sheet 2

INVENTOR
Henri J. Houpert
BY
ATTORNEY

Patented Aug. 22, 1933

1,923,266

UNITED STATES PATENT OFFICE 1,923,266

PLANT SPRAYING APPARATUS

Henri J. Houpert, Rye, N. Y.

Application April 4, 1931. Serial No. 527,683

3 Claims. (Cl. 299—83)

The object of the invention is to provide a simple and satisfactory apparatus for spraying vegetation with insecticide or fungicide compounds. The device is especially suitable for use in domestic gardens and grounds, though its utility is not necessarily limited to this field. A particular purpose of the invention is to provide a spraying apparatus which operates with water under pressure obtained through a hose from a water distribution system such as the water system of a city or town. The object is further to provide means whereby the water thus obtained is caused to take into solution from a charge of spraying composition, a substantially uniform proportion of such composition throughout the operation and as long as any material part of the charge remains unconsumed. Still another object is to make it easy to re-charge the apparatus when the composition is exhausted. Other objects and advantages will be apparent to those skilled in the art as the specification proceeds.

The apparatus includes a jar or receptacle to receive the charge of spraying composition, this receptacle being adapted to hold pressure and having an inlet to be connected by a hose with a hose connection of the water system. An outlet from the receptacle is connected by a smaller hose with a spray nozzle, the receptacle being preferably placed at a convenient spot while the user moves about among the plants with the spray nozzle, though with less convenience the receptacle might be carried in the hand, in which event the spray nozzle could be connected directly to the receptacle, without the use of the second hose.

The charge of spraying composition is placed in the receptacle, which can be opened and tightly closed, the water is turned on, and the liquid acting on the composition in the receptacle forms a solution of approximately constant strength, which is delivered through the spray nozzle. The composition is preferably held in an inner shell, which with the charge of composition preferably constitutes a re-fill cartridge enabling the receptacle to be conveniently replenished with composition when a charge has been used up.

Provision is made for a mixing chamber in the receptacle, or in the inner shell, where the water is brought into contact with the composition in a manner insuring a gradual dissolving of the composition at a rate to produce continuously a proper strength of spray solution. The composition is preferably a plastic, soluble mass, such as soft-soap containing a nicotine preparation. A perforated wall separates the mixing chamber or liquid space in the receptacle from the composition chamber. The size and/or number of the openings in this septum regulate the access of the water to the composition and should be predetermined in relation to the specific composition, the manner of introducing the water and the capacity of the mixing space or spaces. The water is preferably delivered into a mixing space above this perforated wall through a small pressure jet nozzle or orifice. The mixing chamber is full of water, or of water and air, under pressure, during the use of the apparatus, and the pressure of the liquid, together with the circulation which is set up in the mixing chamber by the action of the jet, are factors in securing the proper impregnation of the liquid with the spraying materials.

In order further to insure the production and delivery of a solution of approximately even strength, means are preferably provided for keeping the composition against or adjacent the perforated septum notwithstanding the wasting away of the material. For this purpose a feeding means is employed, and while the feeding means may be varied, I prefer to employ a float which gently presses the composition upward with uniform force as the charge is dissolved away at the top. Such float may be disposed in the lower part of the inner shell, against the bottom of the charge, the lower end of the shell being open and a space or passage being provided between the shell and the wall of the receptacle so that the water admitted to the receptacle can pass downward to act on the float.

Other features will be described in the body of the specification.

The form of the apparatus can be varied in many particulars, and the foregoing general explanation of the invention and the following description of one certain embodiment are to be understood in an illustrative sense.

In the accompanying drawings, forming part hereof:

Fig. 1 is a side elevation of the complete apparatus in use, portions of the supply hose and of the delivery hose of indeterminate length being broken out;

Fig. 2 is a vertical section through the receptacle and its contents, the supply hose and the delivery hose being broken away;

Figure 3:
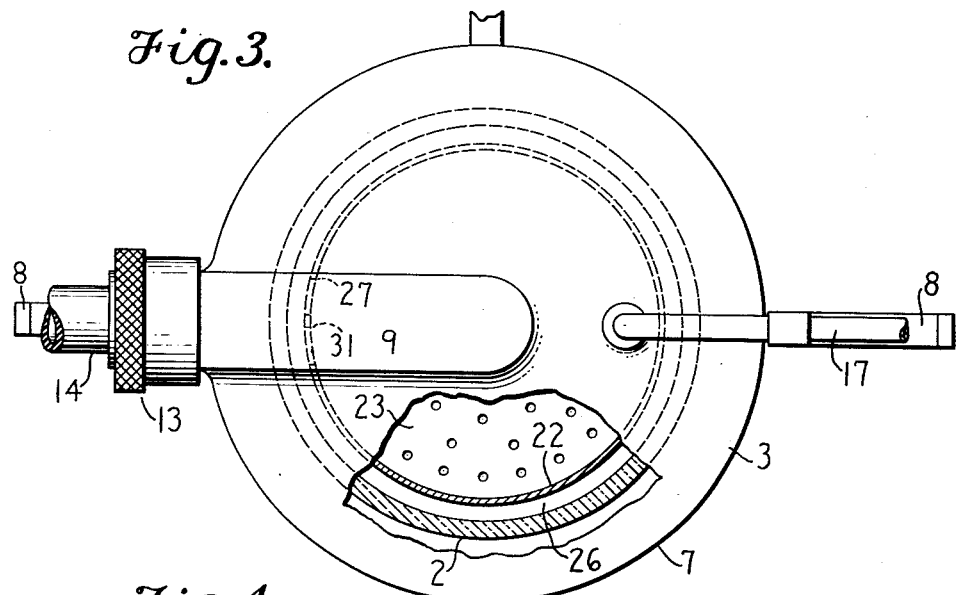
Fig. 3 is a plan view of Fig. 2, with a portion of the cover broken out.

A transparent glass jar 2 having a metal cover 3 forms the receptacle. A gasket 4 between the cover and the top of the jar insures a water and pressure-tight closure when the cover is forcibly secured to the body of the jar. This may be accomplished in a variety of ways. As shown, the body of the jar has an external shoulder 5 to receive the pressure of a clamping ring 6 which is externally screw-threaded to engage an internal thread in a depending rim 7 of the cover. By screwing this ring in one direction the cover is drawn down upon the gasket, and on unscrewing it the cover can be taken off.

A stand is preferably provided to enable the jar to be supported stably on the ground and to keep it from being easily overturned. In the preferred construction spreading legs 8 are fixed at their upper ends to the ring 6 for this purpose, the legs being preferably long enough so that the jar is suspended within a wide-base stand.

The cover 3 has a boss 9 containing a supply passage 10, at the inner end of which is a jet nozzle 11 projected or directed into a mixing chamber 12. At the outer end of the inlet boss there is a coupling 13 for attaching the end of a garden hose 14. The other end of this hose is connected to an outlet 15 from the town or local water supply system, when the apparatus is in use.

The outlet 16 from the receptacle, which may be a piece of bent pipe fixed tightly in the cover, is connected with another length of small hose 17, and on the end of this hose there is a spray nozzle. The spray nozzle may consist of a piece of metal tube 18 serving as a handle, and a spray nozzle proper 19, the stem of which is pivotally connected with the body of the nozzle, as indicated at 20, so that the nozzle can be turned to different angles. The effective area of the outlet from the receptacle, up to and including the spray nozzle, is to be small enough in relation to the inlet 11, so that the open spaces in the interior of the receptacle will be filled with water under pressure during the use of the apparatus.

Figure 4:
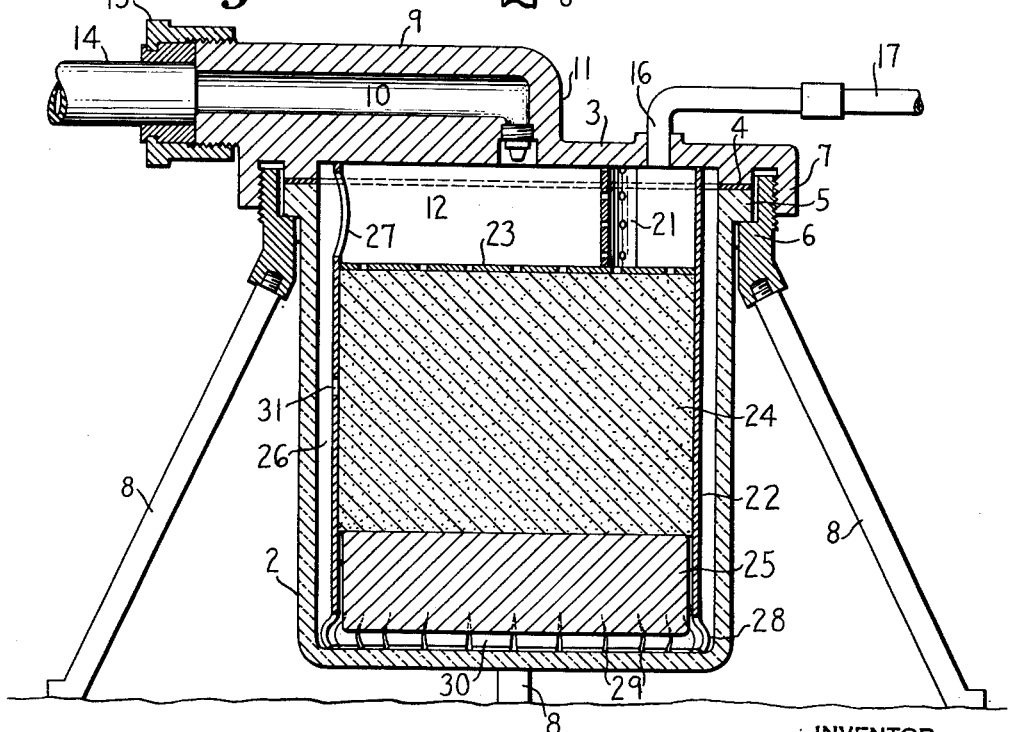
Fig. 4 is a view similar to Fig. 2 showing a modification.

In Fig. 2 the inlet 11 and outlet 16 are shown projecting down into the mixing chamber. With such an arrangement a cushion of air may be trapped in the upper part of the mixing chamber. If the inlet and outlet are flush with the under side of the cover as shown in Fig. 4 all air will be driven out and the mixing chamber will be entirely full of liquid solution.

The inlet 11 preferably delivers into the center of the mixing chamber, whereas the outlet 16 is at one side, but the positions and spacing of the inlet and outlet may be varied. Fig. 4 illustrates a perforated shield 21 in the mixing chamber between the inlet and the outlet, and other arrangements for baffling or intercepting any too direct flow from inlet to the outlet may be employed.

An inner shell 22 can be introduced into or removed freely from the receptacle when the latter is opened. The form of this shell or charge-holder can be varied. As illustrated it is open at its upper and lower ends and is provided with a horizontal perforated partition 23 nearer its upper end. The upper end of the shell is shown bearing against the under side of the cover, though this is not essential, and the mixing chamber can be considered to be the space in the upper part of the shell above the septum 23. However, the mixing chamber and the perforated septum need not be part of or included within the charge holder. The openings in the septum are preferably distributed uniformly throughout its area.

The charge 24 of spray composition initially fills the interior of the shell beneath the septum to within a short distance of the lower end of the shell, which is occupied by a float 25. The shell is somewhat smaller than the internal area of the receptacle, so that there is a liquid space or passage 26 extending to the bottom of the shell, enabling the water to act upon the float. Naturally access of the water to the float chamber may be arranged for in other ways. The mixing chamber might be bounded by the wall of the receptacle rather than by an upper part of the shell. When the shell is extended upward to the cover as shown, an opening 27 is provided in the shell above the septum 23 to allow water to pass from the mixing chamber to the space 26.

The lower end 28 of the shell may be cut into tongues and expanded substantially as shown. Such formation will approximately center the shell in the receptacle, notwithstanding variations incident to manufacture in the dimensions of the receptacle, and the openings 29 will admit water from the space 26 to the space 30 beneath the float.

The operation is as follows. The apparatus is connected up as illustrated in Fig. 1, the receptacle containing the shell 22 with its charge of spray composition. The water is turned on and passes through the hose 14 to the nozzle 11, from which a small but forceful jet is delivered into the mixing chamber. All the empty spaces in the receptacle quickly become filled with liquid under substantial pressure, except that in a form such as shown in Fig. 2 some air may be trapped in the upper part of the mixing chamber. The liquid in the mixing chamber acts on the composition 24 through the openings in the septum, dissolving the material at a predetermined rate, and the solution passes out through the outlet 16 and hose 17 to the spray nozzle 19.

As the charge is dissolved the float 25 rises and keeps the composition against or in proximity to the septum, so that the conditions in respect to contact between the water and the composition remain uniform as long as any of the composition is left.

A sight-opening 31 may be provided in the side of the shell 22 below the septum 23. The location of this opening, if it is present, is preferably such that when the float is visible through the opening the user will know that a considerable part of the charge has been used, and when the float passes above the opening and is no longer visible the user will know that the charge is exhausted or practically so.

In order to re-charge the receptacle, the cover is removed, the empty shell 22 is removed and another shell containing a charge is introduced. The shell preferably forms part of a re-fill package. It may be made of metal, or it could be of paper material strong enough to preserve its integrity in the presence of liquid for a sufficient length of time. However, the shell need not necessarily be discarded since it could be re-filled by the user. In the case of a re-fill package, it will be understood that the lower portion of the shell, which is to be occupied by the float, may be occupied in the package by an entrant cap or in any other suitable manner. The use of a re-fill cartridge, the shell of which is cheap enough to be thrown away when the charge of composition is used up, is very desirable since the user does not have to handle the composition.

Since numerous modifications of the apparatus will suggest themselves, it is to be understood that the invention is not limited to the particular embodiments which have been described.

I claim:

1. An apparatus for spraying plants comprising a receptacle adapted to hold pressure and having means for opening and for tightly closing it, means in said receptacle for confining a charge of soluble plant-spray composition, said means including a perforated wall above the charge, there being a space for liquid in the receptacle outside said wall, an inlet to the liquid space of the receptacle having a connection adapted to receive a hose for supplying the same with water under pressure, an outlet from the liquid space for conducting the resulting solution to a spray nozzle, and a float in the lower part of the apparatus and beneath the charge for feeding said composition to said wall as the composition is dissolved by the water.

2. An apparatus for spraying plants comprising a receptacle adapted to hold pressure and having means for opening and for tightly closing it, a removable inner shell for holding a charge of soluble plant-spray composition, there being liquid spaces between said shell and the walls of the receptacle, a float in the lower part of the apparatus and beneath the charge for feeding the composition upward in the shell, a perforated wall against which the charge is kept by the action of said float, means for admitting water under pressure through a hose to the receptacle, and means for conducting off the resulting solution to a spray nozzle.

3. An apparatus for spraying plants comprising a receptacle adapted to hold pressure and having means for opening and for tightly closing it, a removable inner shell for holding a charge of soluble plant-spray composition, there being a mixing chamber above the charge in said shell and a passage for water to pass downward to the bottom of the shell, a float at the bottom of the shell for feeding the composition upward, a perforated wall separating the charge from said mixing chamber, an inlet to the receptacle, means for connecting a hose to said inlet to supply water under pressure thereto, and an outlet from the receptacle for conducting resulting solution to a spray nozzle.

HENRI J. HOUPERT.